US008672746B2

(12) United States Patent
Burford

(10) Patent No.: US 8,672,746 B2
(45) Date of Patent: Mar. 18, 2014

(54) HORSE-RACING SIMULATION WAGERING GAME

(76) Inventor: Sylvester Burford, Lewisburg, WV (US)

( * ) Notice: Subject to any disclaimer, the term of this patent is extended or adjusted under 35 U.S.C. 154(b) by 0 days.

(21) Appl. No.: 13/560,783

(22) Filed: Jul. 27, 2012

(65) Prior Publication Data

US 2013/0157748 A1 Jun. 20, 2013

Related U.S. Application Data

(60) Provisional application No. 61/512,275, filed on Jul. 27, 2011.

(51) Int. Cl.
*A63F 13/00* (2006.01)

(52) U.S. Cl.
USPC .................... 463/25; 463/20; 463/21; 463/22

(58) Field of Classification Search
USPC .................................... 463/16, 20, 21, 22, 25
See application file for complete search history.

(56) References Cited

U.S. PATENT DOCUMENTS

2006/0009281 A1* 1/2006 Stronach ......................... 463/28
2006/0116187 A1* 6/2006 Johnson et al. ................. 463/16
2008/0268930 A1* 10/2008 Miller et al. ...................... 463/6
2009/0054127 A1* 2/2009 Sweary et al. .................. 463/16
2009/0075730 A1* 3/2009 Ohe et al. ........................ 463/29
2009/0186676 A1* 7/2009 Amaitis et al. .................. 463/12

* cited by examiner

*Primary Examiner* — James S McClellan

(74) *Attorney, Agent, or Firm* — Howard & Howard Attorneys PLLC

(57) ABSTRACT

Systems and methods for providing a wagering game which involve providing a plurality of game pieces, intermediate game events, and intermediate game event modifiers for each of the game pieces, wherein each intermediate game event modifier is associated with a distinct intermediate game event; receiving one or more wagers relating to a final game outcome; randomly generating a value for each of the distinct intermediate game events; determining an intermediate game event result for each game piece, wherein the intermediate game event result includes the randomly generated value as modified by the intermediate game event modifier for the distinct intermediate game event; determining a final game outcome for each game piece, wherein the final game outcome is the total of each of the distinct intermediate game event results; and resolving the one or more wagers received based on the final game outcome.

10 Claims, 3 Drawing Sheets

HORSE-RACING SIMULATION WAGERING GAME

CROSS-REFERENCE TO RELATED APPLICATIONS

This application claims the benefit of U.S. Provisional patent application No. 61/512,275, which was filed Jul. 27, 2012, the disclosure of which is incorporated herein by reference.

BACKGROUND OF THE INVENTION

1. Field of the Invention

The invention generally relates to systems and methods of providing, hosting, conducting and/or modifying wagering games. In particular, the invention relates to systems and methods for providing, hosting and/or conducting a wagering game using randomly generated outcomes, among other things.

2. Description of the Related Art

Wagering games, such as Blackjack and poker, are very popular with players. While many games currently exist, additional games and variations of existing wagering games are always of interest to players and gaming operators to maintain player interest, among other things, and may be provided in a variety of formats, including as a table game, electronic platform, or a combination thereof, or through a networked system. Thus, there continues to be a need for new games to compete with or replace the most popular games being played today.

SUMMARY OF THE INVENTION

The invention is generally directed to wagering games in which a final outcome is based on a series of intermediate outcomes, wherein each intermediate outcome is determined by a random element or randomly determined value and a preset, non-random or previously determined element or value.

In some embodiments, the non-random element is an assigned advantage or disadvantage. In some embodiments, the random element may be provided by a dice roll, a randomly drawn card selected from a deck or card selected from randomly shuffled deck, a randomly drawn ball from a container of balls, or simulations thereof, or a number provided via a random number generator.

In some embodiments, wagers may be placed on the final outcome and intermediate outcomes.

The wagering game may be in embodied as a competition involving a plurality of contestants. In this embodiment, the final outcome is determined by one of the contestants in the plurality achieving a preset criterion, such as a rank, position or value, prior to the other contestants achieving the preset criterion. Achieving the preset criterion is based on the cumulative results of each intermediate outcome for the contestants in comparison with one another. Each intermediate outcome is determined by combining a randomly determined value with a preset assigned value, until the preset criterion is achieved. One randomly generated value may be used for all the contestants to determine a single intermediate outcome. Alternatively, each contestant may receive a randomly generated value for determining a single intermediate outcome. Likewise a preset assigned value may be constant for each contestant or differ for one or more intermediate outcomes. Each intermediate outcome may differ until the final outcome is determined.

In one example, a randomly generated number may be acquired for each contestant in determining a single intermediate outcome. This number will then be added to a preset assigned number for that contestant, which may differ depending on the contestant. The preset criterion for determining the final outcome may be based on the contestant reaching a particular number over any amount of intermediate outcomes, or alternatively, the contestant having the highest number after a certain amount of intermediate outcomes.

In one embodiment, the non-random element is an assigned value for each contestant which will be added to a randomly generated number to determine an intermediate outcome for that contestant. The value may be any number, including positive and negative numbers or no value, that is, zero. The preset criterion is the contestant with the highest number after a preset amount of intermediate outcomes is the winner. Likewise, the contestant with the second highest number after the preset amount of intermediate outcomes is in second place, the third highest is in third, and so on. It should be readily apparent that the non-random element, that is the assigned number of this embodiment, effectively changes the odds of each contestant achieving the preset criterion in comparison with the other contestants.

In the aforementioned embodiment, the assigned number for each intermediate outcome may be displayed to potential wagerers or the relative odds of each contestant achieving the preset criterion may be displayed. Various wagers may be received, wherein payouts are based on the odds as adjusted by the non-random element. For example, the non-random element may be used to variably favor one or more contestants over one another and the other contestants. A wager received on a highly favored contestant achieving the preset criterion may be associated with a smaller payout than a wager received on a less favored contestant. Wagers may also be received on contestants' positions relative to the respective contestant achieving the preset criterion, such as for example, wagers may be received on contestants being in one of second or third place.

In some embodiments, the invention is directed to a method of providing a wagering game comprising the steps of: providing a plurality of game pieces, wherein each game piece has a distinguishing feature; providing a plurality of intermediate game events; providing a plurality of intermediate game event modifiers for each of the game pieces, wherein each intermediate game event modifier of the plurality is associated with a distinct intermediate game event of the plurality of intermediate game events; receiving one or more wagers relating to a final game outcome; randomly generating a value for each of the distinct intermediate game events; determining an intermediate game event result for each game piece, wherein the intermediate game event result includes the randomly generated value as modified by the intermediate game event modifier for the distinct intermediate game event; determining a final game outcome for each game piece, wherein the final game outcome is the total of each of the distinct intermediate game event results; and resolving the one or more wagers received based on the final game outcome.

In some embodiments of the aforementioned method, the plurality of intermediate game event modifiers for each of the game pieces is randomly determined.

In some embodiments of the aforementioned method, the values randomly generated for each of the distinct intermediate game events is randomly generated from within a preset range of values.

In some embodiments, the aforementioned method further includes the step of displaying the respective pluralities of game pieces, intermediate game events and intermediate game event modifiers in tabular form.

In some embodiments, the aforementioned method further includes the step of displaying wagering odds after the step of providing a plurality of intermediate game event modifiers.

The invention is also directed to a system for providing a wagering game, which includes a display for displaying a plurality of game pieces, wherein each game piece has a distinguishing feature; a plurality of intermediate game events; and a plurality of intermediate game event modifiers for each of the game pieces, wherein each intermediate game event modifier of the plurality is associated with a distinct intermediate game event of the plurality of intermediate game events; a communication device for receiving one or more wagers relating to a final game outcome; and a processor for randomly generating a value for each of the distinct intermediate game events; determining an intermediate game event result for each game piece, wherein the intermediate game event result includes the randomly generated value as modified by the intermediate game event modifier for the distinct intermediate game event; determining a final game outcome for each game piece, wherein the final game outcome is the total of each of the distinct intermediate game event results; and resolving the one or more wagers received based on the final game outcome.

The communication device may be a data input and/or data output device or a remote computer terminal, such as a home computer or mobile device with access to local or global network. The system and communication interface may be configured for providing the wagering game to players via an online system or the Internet. The processor may also be remotely located from the communication device and/or display device. In some embodiments, the communication device, processor and display device may be mounted within a unitary housing, and the aforementioned system may be an electronic gaming machine or electronic platform including multiple data input devices providing player positions.

Some embodiments of the invention are also directed to a non-transitory machine readable media for providing a wagering game associated with an underlying game including one or more software programs, code and/or data segments as necessary to provide any of the methods described herein on one or more machines.

DETAILED DESCRIPTION OF THE INVENTION

It should be understood that each of the methods and individual steps recited herein may be partially or wholly carried out in a variety of ways and/or systems, which may include, but are not limited to, a live dealer physically causing a random number to be generated in a casino, such as through the random selection of a playing card or rolling of a die or dice, an electronic gaming machine (EGM) for one or more players, standalone multiplayer platforms which may include a player interface such as a touchscreen display and a physical or virtual depiction of game events, through a home computer or portable computing device, such as a tablet computer or mobile phone capable of communicating with a network or over the Internet, global telecommunication network or world wide web. It should further be understood that the methods and systems of the invention are described herein in connection with a exemplary game for illustrative purposes only, as the methods and systems of the invention may be employed, combined or integrated with other games.

Figure 1:
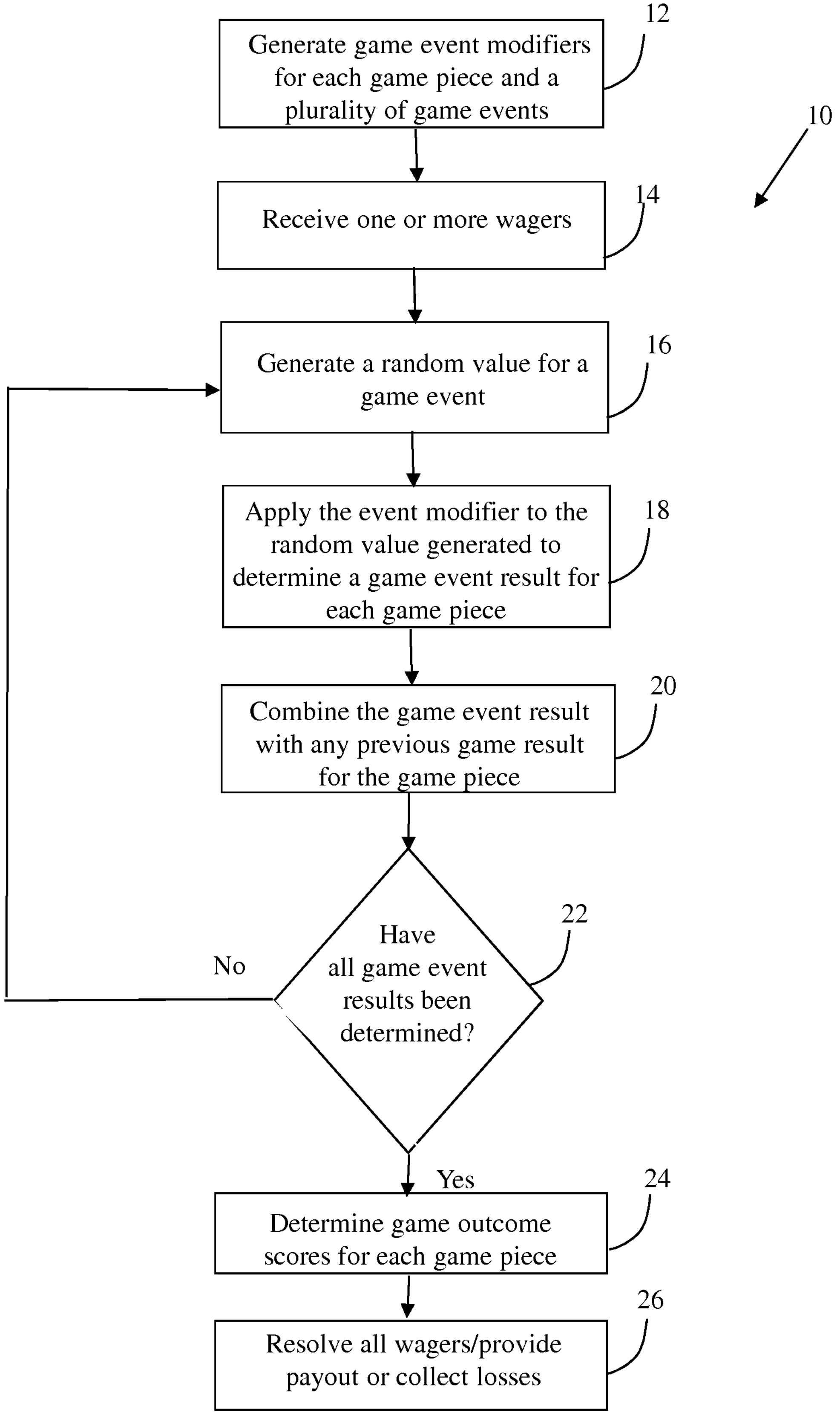
FIG. 1 is a process flow chart depicting an exemplary embodiment of the invention.
Figure 2:
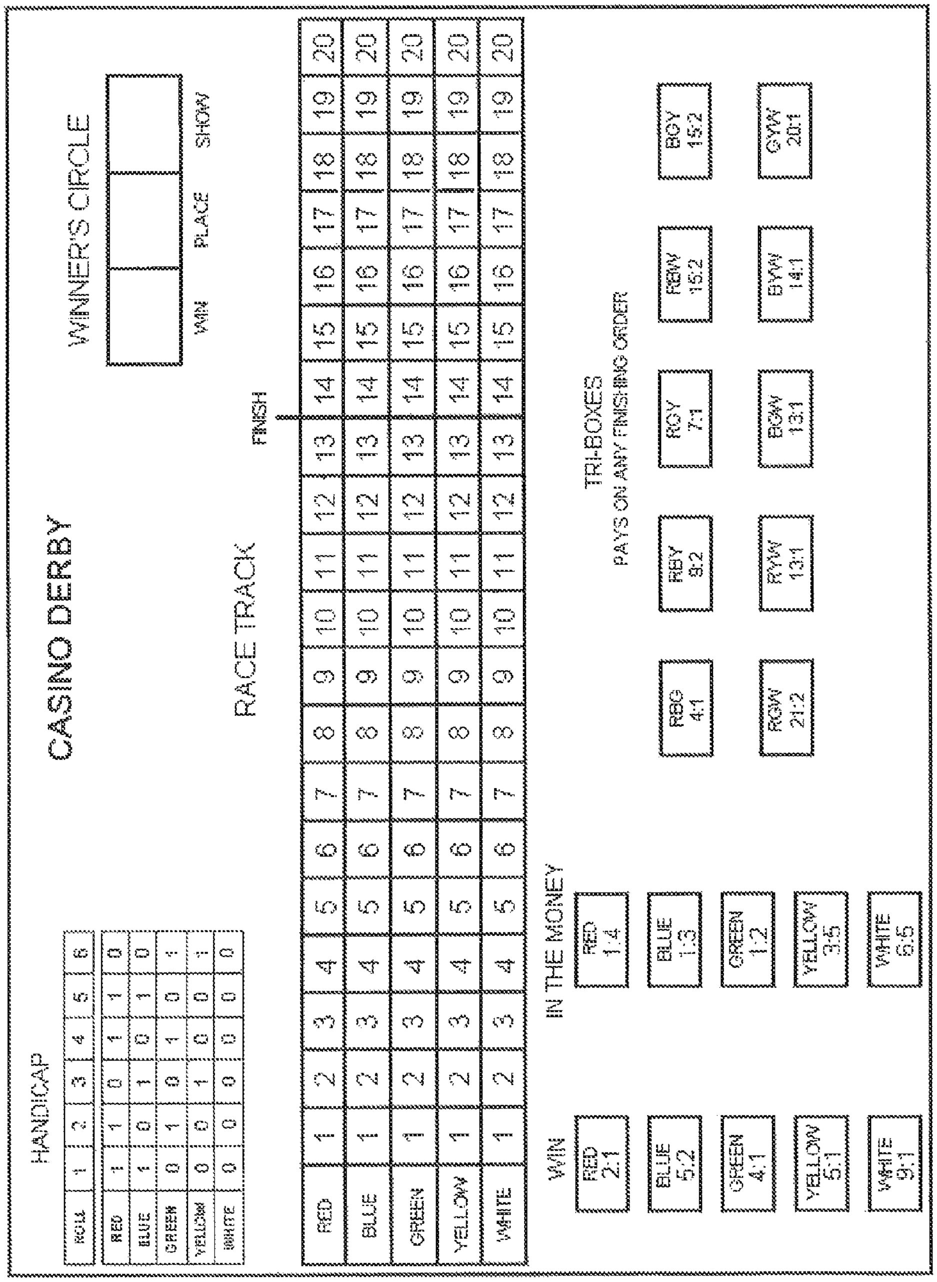
FIG. 2 illustrates a display used with another exemplary embodiment of the invention.

FIG. 1 provides an embodiment of a method of providing, hosting and/or conducting a wagering game as disclosed herein which is generally referred to by the reference numeral 10.

In step 12, game event modifiers are generated for each game piece involved in the underlying game and over a plurality of game events. The game pieces may be of any type, character or number, so long as they are distinguishable from one another in some manner. For example, they may be a physical or virtual representation of people, objects or animals, or combinations thereof. The number of the plurality of game events may be randomly selected or a preselected amount of game events. The game event modifiers may be expressed in any form, such as numbers, or involve algebraic equations, and may have properties such as adding to, subtracting from, multiplying another number, such as the randomly generated game event value discussed herein. The game event modifiers may be expressed as numbers and displayed as a grid or table, as shown in the exemplary table below, with the game events in the top heading, game pieces on the rows and game event modifiers associated therewith displayed as data.

Exemplary Table of Game Event Modifiers

| Game Piece | Game Event 1 | 2 | 3 | 4 | 5 | Score |
|---|---|---|---|---|---|---|
| A | +2 | +1 | +1 | x2 | +1 | |
| B | −1 | −2 | −1 | −1 | −3 | |
| C | 0 | +1 | +3 | 0 | +2 | |
| D | 0 | 0 | 0 | 0 | 0 | |
| E | +3 | +1 | +2 | −3 | −4 | |

It is envisioned that in some embodiments the game event modifiers may be randomly generated for each game piece prior to the start of a game and displayed to players along with wagering odds relating to the possible game outcome. For example, a first game piece having received favorable game event modifiers, such as higher values to be added during each game event like Game Piece A in the above table, would have a greater odds of achieving a high ranking game outcome than a second game piece having received less favorable game event modifiers, such as lower values or no values to be added during any game event like Game Piece D in the above table, and therefor wagers received in connection with the first game piece would have lower potential payouts as compared with wagers received in connection with the second game piece.

In step 14 one or more wagers are received. In this embodiment, all wagers are optional, whereas in some embodiments one or more wagers may be required. Wagers may be placed on the game events or game outcome for each game piece or multiple game pieces, such as the top three game pieces having the highest three game outcome results.

In step 16, a random value is generated for a game event. The value may be randomly generated through any conventional method such as balls drawn from a cage, dice throws, a card delivered from one or more decks of shuffled cards, or via a computerized random number generator. The method or system for generating random values may be the same for each game event or differ. The range of possible values may be preset for each game event, such that a random value may be selected from a specific group such as from −5 to 5 or 0 to 10, etc. For example, a single die may be used having numbers 1 to 6 or prearranged groupings of cards from 2 through 10, with customized values for face cards and Aces. In some embodiments, the preset ranges may differ or be the same for each game event.

In step 18, the game event modifier is applied to the randomly generated value to determine a game event result for each game piece. Thus, for example, if the randomly generated value in the first game event is the number 4 in game event 1, then the above exemplary table would be displayed as follows:

Exemplary Table of Game Event Modifiers

| Game Piece | Game Event 1 | 2 | 3 | 4 | 5 | Score |
|---|---|---|---|---|---|---|
| A | 6 | +1 | +1 | x2 | 0 | 6 |
| B | 3 | −2 | −1 | −1 | −3 | 3 |
| C | 4 | +1 | +3 | 0 | +1 | 4 |
| D | 4 | 0 | 0 | 0 | 0 | 4 |
| E | 7 | +1 | +2 | −3 | −4 | 7 |

Thus, as the table shows, Game Piece E would have the highest rank or game event result in game event 1 while Game Piece B would have the lowest.

In step 20, the current game event result is combined with any previous game results to determine an intermediate game score. For the example discussed, there are no previous game results so that the game event result from game event 1 is the same as the intermediate game score. Any game event or intermediate game score wagers may be resolved at this point or at the end of the game.

As shown in step 22, if all game event results have been determined, then the final game outcome scores for each game piece will be determined in step 24. However, if all game event results have not yet been determined, game 10 will return to step 16 as shown in FIG. 1, and a random value will be generated for a game event.

For example, if the next game event result is 0 then the exemplary table would be displayed as follows:

Exemplary Table of Game Event Modifiers

| Game Piece | Game Event 1 | 2 | 3 | 4 | 5 | Score |
|---|---|---|---|---|---|---|
| A | 6 | 1 | +1 | x2 | 0 | 7 |
| B | 3 | −2 | −1 | −1 | −3 | 1 |
| C | 4 | 1 | +3 | 0 | +1 | 5 |
| D | 4 | 0 | 0 | 0 | 0 | 4 |
| E | 7 | 1 | +2 | −3 | −4 | 8 |

Thus, as the table shows, Game Piece E would have the highest score after game event 2 and Game Piece B would have the lowest score. The order of Game Pieces from highest score to lowest score is now Game Piece E, A, C, D and then B.

As shown in by steps 16, 18, 20 and 22, this continues until all game events have been determined and then in step 24 the final game outcome score for each game piece is determined.

For example, the following table provides the game event results and score if the randomly determined value for Game Event 3 in the foregoing illustration is 3:

Exemplary Table of Game Event Modifiers

| Game Piece | Game Event 1 | 2 | 3 | 4 | 5 | Score |
|---|---|---|---|---|---|---|
| A | 6 | 1 | 4 | x2 | 0 | 11 |
| B | 3 | −2 | 2 | −1 | −3 | 3 |
| C | 4 | 1 | 6 | 0 | +1 | 11 |
| D | 4 | 0 | 3 | 0 | 0 | 7 |
| E | 7 | 1 | 5 | −3 | −4 | 13 |

Thus, as the table shows, the order of Game Pieces from highest score to lowest score is now Game Piece E, A and C are tied, D and then B after Game Event 3.

If the randomly determined value for Game Event 4 is 2, then the following table provides the game event results and score:

Exemplary Table of Game Event Modifiers

| Game Piece | Game Event 1 | 2 | 3 | 4 | 5 | Score |
|---|---|---|---|---|---|---|
| A | 6 | 1 | 4 | 4 | 0 | 15 |
| B | 3 | −2 | 2 | 1 | −3 | 4 |
| C | 4 | 1 | 6 | 2 | +1 | 13 |
| D | 4 | 0 | 3 | 2 | 0 | 9 |
| E | 7 | 1 | 5 | −1 | −4 | 12 |

As the table shows after Game Event 4, the order of Game Pieces from highest score to lowest score is now Game Piece A, C, E, D and then B.

If the randomly determined value for Game Event 5 is −1, then the following table provides the game event results and final game outcome score:

Exemplary Table of Game Event Modifiers

| Game Piece | Game Event 1 | 2 | 3 | 4 | 5 | Score |
|---|---|---|---|---|---|---|
| A | 6 | 1 | 4 | 4 | −1 | 14 |
| B | 3 | −2 | 2 | 1 | −4 | 0 |
| C | 4 | 1 | 6 | 2 | 0 | 13 |
| D | 4 | 0 | 3 | 2 | −1 | 8 |
| E | 7 | 1 | 5 | −1 | −5 | 7 |

As the table shows after Game Event 5, the order of Game Pieces from highest score to lowest score is now Game Piece A, C, D, E and then B.

In step 26, the wagers are resolved, some of which may be resolved based on the final game outcome score while others are based on the hierarchal order of the Game Pieces at the final outcome. Payouts are provided and losing wagers are collected. In the foregoing illustration, since there are no further game events in this illustration subsequent to Game Event 5, the score is the final game outcome score and remaining wagers would be resolved as in step 26.

In another exemplary embodiment, the invention is directed to the embodiment shown in the accompanying Figure and entitled "CASINO DERBY" in which the game simulates live horse racing. The game of this example includes a table layout, colored pucks to represent each racehorse (in this example there are five different horses), five colored six-sided dice (one for each racehorse), and a marker.

The game layout is separated into two different sections. The top half of the layout is the racing area and consists of the Racetrack, Handicap, and Winner's Circle. The bottom half is the betting area. In this example, players may bet on which horse will win, which horses will finish 'in the money' (win, place, or show), and tri-box bets.

The game starts with players placing bets in the betting area on as many bets as they desire to play. The marker is placed in the 'Handicap' chart on the #1 space on the 'Roll' row. The five racehorse pucks are placed in the 'Race Track' on the appropriate colored space at the start of the race. Now the race is ready to begin.

A player rolls the five colored dice simultaneously. The value of the red die is added to the red bonus listed under the #1 'Roll' space in the 'Handicap' area. The red racehorse puck is moved forward that number of spaces. The value of the blue die is added to the blue bonus listed under the #1 'Roll' space in the 'Handicap' area. The blue racehorse puck is moved forward that number of spaces. This is done for all five horses.

After all five horses have been moved, the marker is moved to the #2 space on the 'Roll' row of the 'Handicap' area. The five colored dice are again rolled simultaneously. The value of the red die is added to the red bonus listed under the #2 'Roll' space in the 'Handicap' area. The red racehorse puck is moved forward that number of spaces. The value of the blue die is added to the blue bonus listed under the #2 'Roll' space in the 'Handicap' area. The blue racehorse puck is moved forward that number of spaces. This is done for all five horses.

The race continues in this manner until one of the racehorse pucks lands on the #14 space or higher, then the race is over. The racehorse puck that is farthest down the track is moved to the 'Win' space in the 'Winner's Circle'. The next farthest down the track is moved to the 'Place' space in the 'Winner's Circle', and the third farthest down the track is moved to the 'Show' space in the 'Winner's Circle'.

Ties are resolved with additional rolls of the dice. Each roll continues to increment the 'Handicap' Roll marker by one. 'Handicap' bonuses are applied to tie rolls. Ties are resolved in the order of 'Win', then 'Place', and finally 'Show'. If the number of rolls exceeds six rolls, then start the 'Handicap' roll marker over at space #1.

All bets are taken or paid according to which racehorse pucks are in the 'Winner's Circle'.

The marker is reset at 'Roll' #1 in the 'Handicap' area and all racehorse pucks are returned to the start of the race on their respective colors and a new race is ready to begin.

The invention is also directed to a system for providing wagering games, which includes the following components, among others things: a data input device, a display device, and a data processing device for providing the methods and embodiments of the invention as described herein.

The aforementioned system may be an electronic gaming machine or electronic platform including multiple data input devices providing player positions. The system may also include a transceiving device for providing the wagering game to players via an online system or the Internet. The data input device may also be included in a touch-enabled display device or consist of a remote terminal in communication with the processing device.

It should be understood that the methods and steps recited herein may be partially or wholly carried out in a variety of ways, such as by a dealer or player physically using game elements, via an electronic gaming machine (EGM) in a gaming establishment, through a computer or portable device, such as a mobile phone, capable of communicating via the Internet, global telecommunication network or world wide web. It should further be understood that the methods and systems of the invention are described herein in connection with dice for illustrative purposes only, as the methods and systems of the invention may be used with non-standard dice or any other items with varying distinguishable values or symbols.

Figure 3:
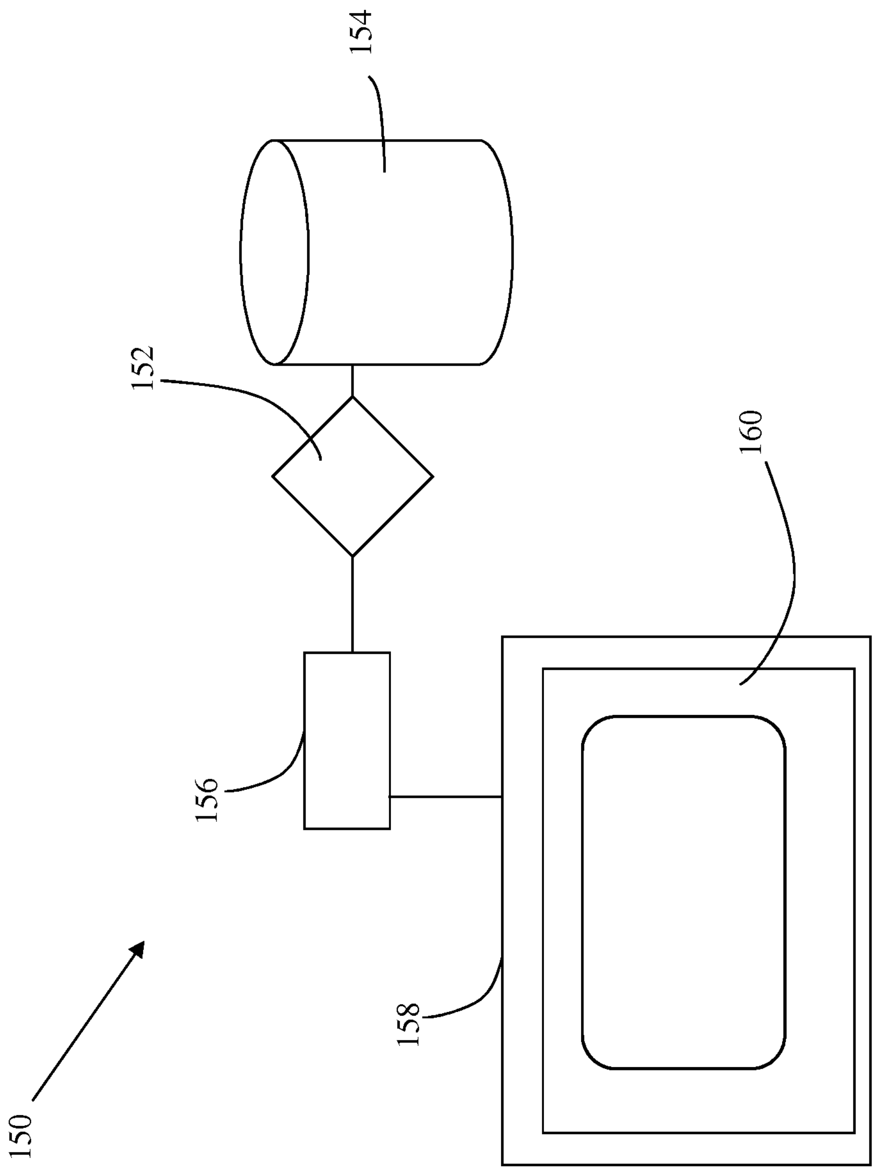
FIG. 3 is a schematic diagram of exemplary system components configured for use with methods according to some embodiments of the invention.

FIG. 3 illustrates an exemplary system 150 constructed in accordance with some embodiments of the invention. System 150 includes processing device 152 in communication with a database or memory device 154, communication or data input/output device 156 and a display device 158. In some embodiments, display device 158 is a touch-enabled device and includes a data input device component. Memory device 154 may include data relating to the underlying game and embodiments of the invention as described herein. A player position 160 is displayed on display device 158 along with virtual representation of a layout and wagering area for displaying tabular information as described herein and transmitting wagers in accordance with any of the embodiments herein, such as method 10. Game event results and final outcomes are displayed and wagers are tracked using display device 158 and processing device 152 as described herein.

Those skilled in the art will readily appreciate that the methods described herein may be incorporated in a system in accordance with the invention using virtual representations of dice, contestants, such as horses, and table layouts. The system of the invention may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as a mobile device. The system of the invention may be provided on electronic platforms with multiple player positions. In addition, the system of the invention may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the invention so long as players and operators thereof are provided with access thereto or the opportunity to play and wager on the game as described herein.

While exemplary methods and applications of the methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the present invention in any way. Accordingly, the invention embraces alternatives, modifications and variations which fall within the spirit and scope of the invention as set forth in the embodiments herein and equivalents thereto.

What is claimed is:

1. A method of providing a wagering game comprising the steps of:

a) providing a plurality of game pieces, wherein each game piece has a distinguishing feature;

b) providing a plurality of intermediate game events;

c) providing a plurality of intermediate game event modifiers for each of the game pieces, wherein each intermediate game event modifier of the plurality is associated with a distinct intermediate game event of the plurality of intermediate game events;

c) receiving one or more wagers relating to a final game outcome;

d) a processing device facilitating the step of randomly generating a value for each of the distinct intermediate game events;

e) determining an intermediate game event result for each game piece, wherein the intermediate game event result includes the randomly generated value as modified by the intermediate game event modifier for the distinct intermediate game event;

f) determining a final game outcome for each game piece, wherein the final game outcome is the total of each of the distinct intermediate game event results; and g) resolving the one or more wagers received based on the final game outcome.

2. A method as recited in claim 1, wherein the plurality of intermediate game event modifiers for each of the game pieces is randomly determined.

3. A method as recited in claim 1, wherein the values randomly generated for each of the distinct intermediate game events is randomly generated from within a preset range of values.

4. A method as recited in claim 1, further comprising the step of displaying the respective pluralities of game pieces, intermediate game events and intermediate game event modifiers in tabular form.

5. A method as recited in claim 1, further comprising the step of displaying wagering odds after the step of providing a plurality of intermediate game event modifiers.

6. A system for providing a wagering game comprising:

a) a display for displaying a plurality of game pieces, wherein each game piece has a distinguishing feature; a plurality of intermediate game events; and a plurality of intermediate game event modifiers for each of the game pieces, wherein each intermediate game event modifier of the plurality is associated with a distinct intermediate game event of the plurality of intermediate game events;

b) a communication device for receiving one or more wagers relating to a final game outcome; and c) a processor for randomly generating a value for each of the distinct intermediate game events; determining an intermediate game event result for each game piece, wherein the intermediate game event result includes the randomly generated value as modified by the intermediate game event modifier for the distinct intermediate game event; determining a final game outcome for each game piece, wherein the final game outcome is the total of each of the distinct intermediate game event results; and resolving the one or more wagers received based on the final game outcome.

7. A system as recited in claim 6, wherein the processor is further configured to randomly generate the plurality of intermediate game event modifiers for each of the game pieces.

8. A system as recited in claim 6, wherein the display, communication device and processor are mounted in a housing.

9. A system as recited in claim 6, wherein the display and communication device are remotely connected for communication with the processor.

10. A system as recited in claim 6, wherein the communication device is further configured for providing a payout.

* * * * *